(No Model.)

J. FINLEY.
FLY NET FOR HORSES.

No. 495,730.

Patented Apr. 18, 1893.

Witnesses:
W. J. Sankey.
R. H. Orwig.

Inventor: James Finley,
By Thomas G. Orwig, Atty.

UNITED STATES PATENT OFFICE.

JAMES FINLEY, OF CLARION, IOWA.

FLY-NET FOR HORSES.

SPECIFICATION forming part of Letters Patent No. 495,730, dated April 18, 1893.

Application filed April 5, 1892. Serial No. 427,946. (No specimens.)

*To all whom it may concern:*

Be it known that I, JAMES FINLEY, a citizen of the United States of America, residing at Clarion, in the county of Wright and State of Iowa, have invented a Fly-Net for Animals' Stalls, of which the following is a specification.

Figure 1:
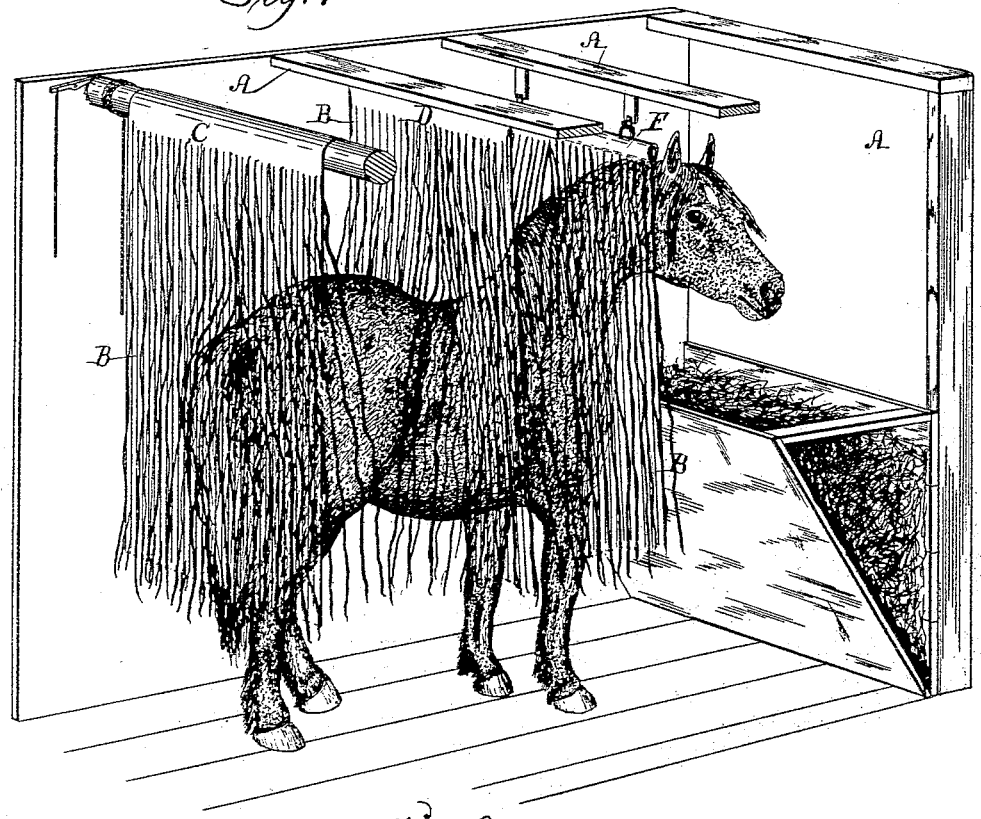
Figure 2:
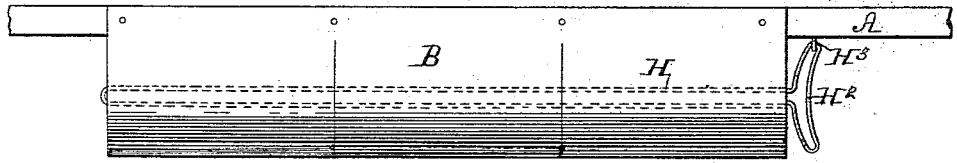
Figure 3:
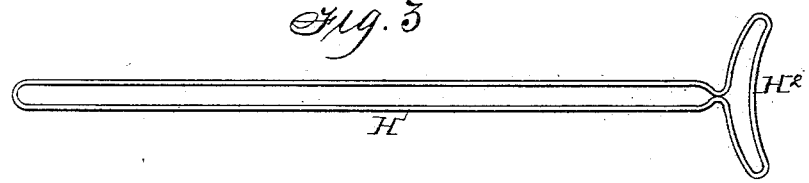

My invention consists in the provision of means whereby the nets may be rolled up when not in use and also in certain other details of construction and combination hereinafter set forth, pointed out in my claims and illustrated in the accompanying drawings in which:

Figure 1 is a perspective view of a stall, with a plurality of nets depending from the roof thereof and also showing a horse in the stall in contact with the nets, as in practical use. Fig. 2 is a side view of a net rolled up as may be done when not in use, showing my preferred method of accomplishing the same. Fig. 3 is a top view of the hook upon which the net is rolled.

Referring to the aforesaid drawings I use the reference letter A to designate the stall. B are fly nets depending from the top or ceiling of the stall. These are preferably in sections, as shown and extended transversely of the stall. There are many forms of fly nets composed of various materials now in common use, and I do not desire to be understood as limiting myself to any particular one. But I believe that the best results may be obtained, both as regards efficiency and durability by the employment of a fringe of leather strings. A number of methods of suspending the nets are shown in the accompanying drawings.

At C the nets are shown attached to a roller having a ratchet device at its one end and means for rotating the roller.

At D the net is fixed directly to the ceiling of the stall and at F straps are hung from the ceiling and provided with hooks to engage the nets.

In Figs. 2 and 3 is shown my preferred means of rolling up the nets when not in use. H is an elongated wire loop of a length approximating the width of the net, which it is adapted to admit, and having a loop $H^2$ at its end extended at right angles thereto, and $H^3$ is a hook secured to the top of the stall in juxtaposition to the net. It is used as follows: The lower ends of the net are placed in the loop which is then rotated until all of the net is wound upon the loop H when the loop $H^2$ is hung upon the hook $H^3$.

Having thus described my invention, what I claim as new, and desire to secure by Letters Patent, is—

1. A fly net composed of a plurality of flexible sections provided with lashes suspended in parallel position to each other across a horse stall and at suitable distances apart along the lengths of the stall from an elevated stationary support, and means for rolling up said sections, arranged and combined to operate in the manner set forth for the purposes stated.

2. In combination with a fly-net composed of a plurality of sections depending from an elevated support, means for rolling up said sections comprising an elongated wire loop adapted to encircle the sections and a transverse loop at its one end adapted to be hung upon a hook when the section is rolled up substantially as and for the purposes stated.

JAMES FINLEY.

Witnesses:
GEO. CURRY,
G. T. ELDRIDGE.